US012761847B2

(12) United States Patent
Fujisawa

(10) Patent No.: US 12,761,847 B2
(45) Date of Patent: Oct. 13, 2026

(54) INFORMATION PROCESSING APPARATUS AND CONTROL METHOD FOR THE SAME

(71) Applicant: CANON KABUSHIKI KAISHA, Tokyo (JP)

(72) Inventor: Minoru Fujisawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 18/665,746

(22) Filed: May 16, 2024

(65) Prior Publication Data

US 2024/0385792 A1 Nov. 21, 2024

(30) Foreign Application Priority Data

May 18, 2023 (JP) ................................ 2023-082487

(51) Int. Cl.
*G06F 3/12* (2006.01)

(52) U.S. Cl.
CPC ............ *G06F 3/1297* (2013.01); *G06F 3/121* (2013.01); *G06F 3/1234* (2013.01); *G06F 3/1288* (2013.01)

(58) Field of Classification Search
CPC ...... G06F 3/1297; G06F 3/121; G06F 3/1234; G06F 3/1288
See application file for complete search history.

(56) References Cited

U.S. PATENT DOCUMENTS 8,477,339 B2 * 7/2013 Suzuki ................. G06K 15/102 358/1.15
2005/0174606 A1 8/2005 Matsueda et al.
2016/0006884 A1 * 1/2016 Ishida .................. H04N 1/0083 358/474

FOREIGN PATENT DOCUMENTS

JP H11-119944 A 4/1999
JP 2004-291595 A 10/2004

OTHER PUBLICATIONS

NPL: InnovationQ+ by IP.com and IEEE: Results Publication Date Range: Nov. 2, 1999 to Nov. 28, 2024.*
NPL, InnovationQ+ by IP.com and IEEE, Results Publication Date Range: Oct. 30, 2001 to Nov. 28, 2024.*
European Office Action issued Oct. 15, 2024 during prosecution of related European Patent Application No. 24173458.1.

* cited by examiner

*Primary Examiner* — Quang N Vo
(74) *Attorney, Agent, or Firm* — VENABLE LLP

(57) ABSTRACT

An information processing apparatus includes an acquisition unit configured to acquire, from a user, designation of printing data to be printed by a printing apparatus, a compression unit configured to generate compressed data by compressing the printing data in a case where a format of the printing data is a compression target, and a request unit configured to request the compressed data to be printed by the printing apparatus in a case where the format of the printing data is a compression target, and request the printing data to be printed by the printing apparatus in a case where the format of the printing data is not a compression target.

11 Claims, 9 Drawing Sheets

FIG. 8

800

| | 801 ATTRIBUTE | 802 VALUE |
|---|---|---|
| 811 | color-supported | true |
| 812 | media-supported | iso_a4_210x297mm, iso_a3_297x420mm |
| 813 | document-format-supported | pdf, jpeg, pwg-raster, text |
| 814 | compression-supported | zip, gzip |
| 815 | copies-supported | 1-99 |

INFORMATION PROCESSING APPARATUS AND CONTROL METHOD FOR THE SAME

BACKGROUND OF THE INVENTION

Field of the Invention

The present invention relates to an information processing apparatus and a control method for the same.

Description of the Related Art

It is desirable to efficiently transmit printing data from an information processing apparatus to a printing apparatus. In Japanese Patent Laid-Open No. 2004-291595, a printer driver compresses printing data and transmits this compressed data to a printing apparatus. This reduces the amount of data communication. Depending on the format of the printing data, even if the printing data is compressed, the amount of data may hardly change. Compressing printing data in such a format wastes time and load for performing the compression processing, which can reduce the efficiency of printing processing.

SUMMARY OF THE INVENTION

Some aspects of the present disclosure provide a technique for efficiently performing printing processing. According to some embodiments, an information processing apparatus, comprising: an acquisition unit configured to acquire, from a user, designation of printing data to be printed by a printing apparatus; a compression unit configured to generate compressed data by compressing the printing data in a case where a format of the printing data is a compression target; and a request unit configured to request the compressed data to be printed by the printing apparatus in a case where the format of the printing data is a compression target, and request the printing data to be printed by the printing apparatus in a case where the format of the printing data is not a compression target is provided.

Further features of the present invention will become apparent from the following description of exemplary embodiments with reference to the attached drawings.

BRIEF DESCRIPTION OF THE DRAWINGS

FIG. 8 is a diagram illustrating an example of printer attributes according to some embodiments.

DESCRIPTION OF THE EMBODIMENTS

Figure 1:
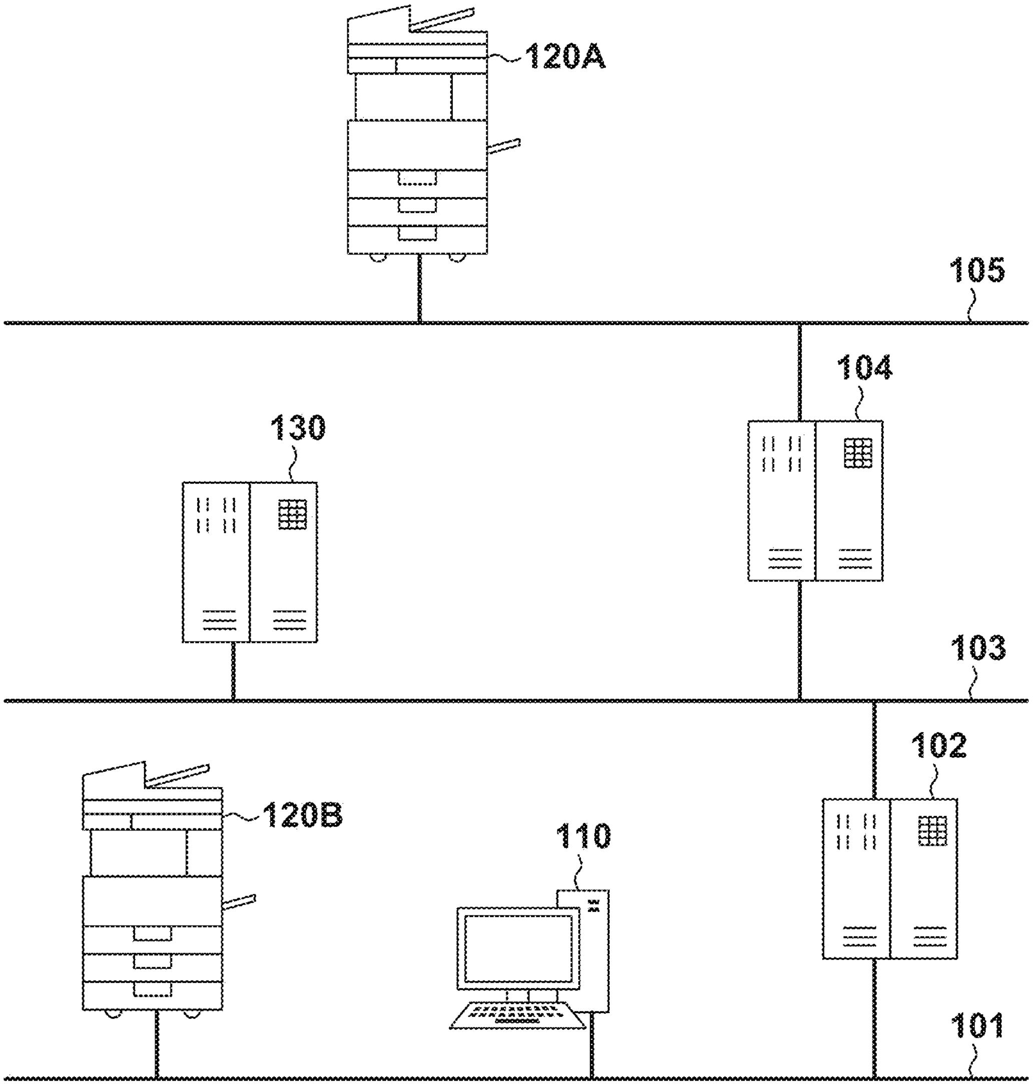
FIG. 1 is a schematic diagram illustrating a configuration example of a printing system according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration Example of Printing System

A configuration example of a printing system according to some embodiments will be described with reference to FIG. 1. The printing system includes, for example, an information processing apparatus 110, printing apparatuses 120A and 120B, and a printing server 130. The numbers of the components of the printing system are not limited to the example shown in FIG. 1. For example, a printing system need not include one of the printing apparatuses 120A and 120B. The printing system may also include components not shown in FIG. 1.

The information processing apparatus 110 and the printing apparatus 120B are connected to the same local area network (LAN) 101. The LAN 101 may be a wired LAN, a wireless LAN, or a combination of both. The LAN 101 is connected to a wide area network 103 (e.g., the Internet) through a firewall 102. The printing server 130 is also connected to the wide area network 103. The information processing apparatus 110 and the printing apparatus 120B can communicate with each other within the LAN 101 (that is, without going through the wide area network 103). The information processing apparatus 110 and the printing apparatus 120B can communicate with the printing server 130 via the LAN 101, the firewall 102, and the wide area network 103. Alternatively or in addition to this, the information processing apparatus 110 and the printing apparatus 120B may also connect to the wide area network 103 via a cellular network (e.g., a network compliant with the 4th generation communication standard (4G) or the 5th generation communication standard (5G)).

The printing apparatus 120A is connected to a LAN 105. The LAN 105 may be a wired LAN, a wireless LAN, or a combination of both. The LAN 105 is connected to the wide area network 103 through a firewall 104. The LAN 105 is a LAN different from the LAN 101. The printing apparatus 120A can communicate with the printing server 130 via the LAN 105, the firewall 104, and the wide area network 103. Alternatively or in addition to this, the printing apparatus 120A may connect to the wide area network 103 through a cellular network. The information processing apparatus 110 can communicate with the printing apparatus 120A through the LANs 101 and 105, the firewalls 102 and 104, and the wide area network 103.

The printing apparatuses 120A and 120B have a printing function of performing printing based on a printing job. The printing apparatuses 120A and 120B may also include at least one of a scanner function and a fax function in addition to the printing function. A printing apparatus having multiple functions in this manner may be called a multifunction peripheral (MFP). Alternatively, the printing apparatuses 120A and 120B may be dedicated machines (single function peripherals (SFPs)) having only a printing function. The printing may be printing on a sheet-like recording medium such as paper, or may be forming a three-dimensional object (so-called three-dimensional printing).

The printing server 130 provides a print service for transmitting a printing job to any printing apparatus (e.g., the printing apparatus 120A) according to the printing job generated by the information processing apparatus 110. For example, the printing server 130 provides a logical printer to the information processing apparatus 110 and accepts printing jobs for the logical printer. A logical printer is a virtual printing apparatus (e.g., a printer object) provided by the printing server 130. A logical printer can also be called a cloud printer. In contrast to a logical printer, a physical printing apparatus, such as the printing apparatus 120A, may also be referred to as a physical printer. In the following description, logical printers and physical printers are collectively referred to simply as printers. A physical printer can also be called a local printer if it is connected to the same LAN as an information processing apparatus that submits a printing job.

The printing server 130 may be a server in an on-premises environment connected to the wide area network 103, or may be a server in a cloud computing environment (hereinafter simply referred to as a cloud). The print service provided by printing server 130 in the cloud may also be referred to as a cloud print service (hereinafter referred to as CPS). An example of a cloud print service is Universal Print (registered trademark) provided by Microsoft. In the following description, a case will be described in which the printing server 130 is located in the cloud. However, the following description applies equally if the printing server 130 is in an on-premises environment.

The information processing apparatus 110 provides a print function to the user of the information processing apparatus 110. The information processing apparatus may be a personal computer (PC), a smartphone, or another device. The information processing apparatus 110 may designate a physical printer (e.g., the printing apparatus 120B) connected to the same LAN 101 as the output destination, or may specify a logical printer provided by the printing server 130 as the output destination. When a logical printer is specified as an output destination, a physical printer (e.g., printing apparatus 120A) associated with the logical printer performs printing. The information processing apparatus 110 that uses the CPS may be called a client or a client terminal. Printing performed by submitting a printing job to a logical printer can also be called cloud print, remote print, or remote printing. Printing by cloud print may be executed by the printing apparatus 120B connected to the same LAN 101 as the information processing apparatus 110, or may be executed by a printing apparatus (e.g., printing apparatus 120A) that is not connected to the LAN 101. Printing performed by directly submitting a printing job to a physical printer (i.e., within a LAN) may also be referred to as local print or local printing.

The information processing apparatus 110 may also have a printing function included as standard in the operating system (OS). Such a printing function is called a standard printing function. The standard printing function can also be called an OS standard printing function or a native printing function. The information processing apparatus 110 having a standard printing function does not require separate software (e.g., a driver) to use a printing apparatus that supports standard printing functionality. Examples of standard printing functions include AirPrint (registered trademark), which is included as standard in iOS, macOS (registered trademark), and the like, and Mopria (registered trademark), which is included as standard in Android and the like.

Example of Hardware Configuration of Computer

Figure 2:
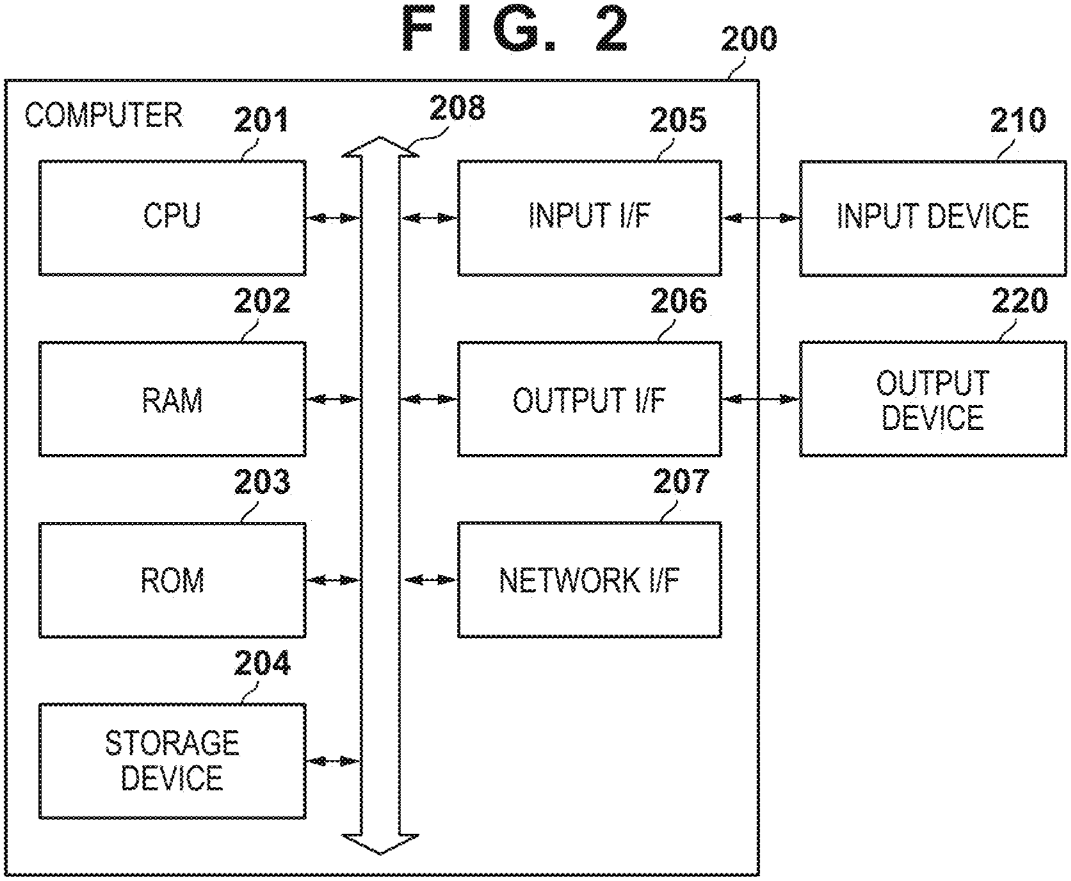
FIG. 2 is a block diagram illustrating an example of a hardware configuration of a computer according to some embodiments.

An example of a hardware configuration of a computer 200 according to some embodiments will be described with reference to FIG. 2. The computer 200 may be used as the information processing apparatus 110 or the printing server 130. The computer 200 may also have the components shown in FIG. 2.

A central processing unit (CPU) 201 is a general-purpose processing circuit that controls the overall operation of the computer 200. A random access memory (RAM) 202 is a volatile memory circuit and is used as a temporary storage region such as a work area for processing performed by the CPU 201. A read-only memory (ROM) 203 is a nonvolatile memory circuit that stores programs and data used in processing by the CPU 201. A storage device 204 is a nonvolatile storage device and stores programs and data used in processing by the CPU 201. The storage device 204 may be, for example, a hard disk drive (HDD) or a solid state drive (SSD). The storage device 204 may also be referred to as a secondary storage device. Operations performed by the computer 200 may be realized by the CPU 201 executing a program read out from the storage device 204 into the RAM 202.

An input interface (I/F) 205 is an I/F for exchanging signals with an input device 210. The input device 210 is a device that acquires input from a user of the computer 200. The input device 210 may be, for example, a keyboard, a touch panel, a microphone, a mouse, or any combination thereof. An output I/F 206 is an I/F for exchanging signals with an output device 220. The output device 220 is a device that provides information to the user of the computer 200. The output device 220 may also be, for example, a display, a speaker, or any combination thereof. A network I/F 207 is an I/F for communicating with a device external to the computer 200. Each of the CPU 201, the RAM 202, the ROM 203, the storage device 204, the input I/F 205, the output I/F 206, and the network I/F 207 is connected to a system bus 208. In the example of FIG. 2, the input device 210 and the output device 220 are shown as separate devices from the computer 200. Alternatively, the computer 200 may include the input device 210 and the output device 220.

Example of Functional Configuration of Printing Server

Figure 3:
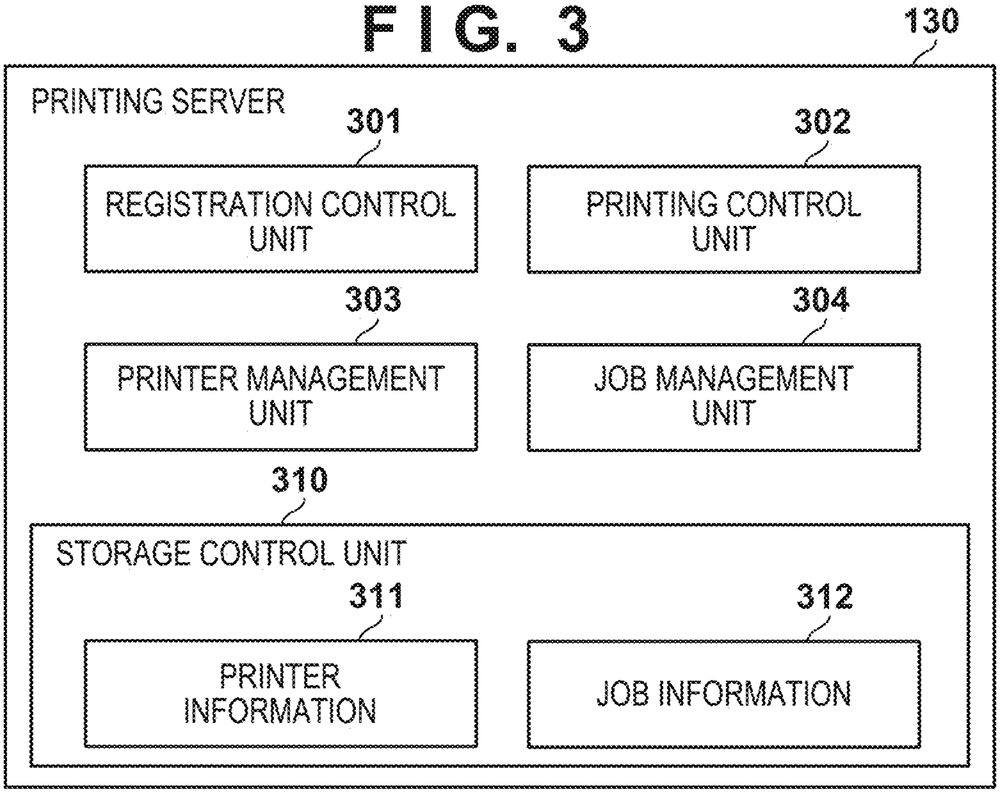
FIG. 3 is a block diagram illustrating an example of a functional configuration of a printing server according to some embodiments.

An example of a functional configuration of the printing server 130 will be described with reference to FIG. 3. The printing server 130 may have the functional units shown in FIG. 3. The printing server 130 may have functional units not shown in FIG. 3. Each functional unit in FIG. 3 may be realized by the CPU 201 executing a program read out to the RAM 202. Alternatively, some or all of the functional units in FIG. 3 may be implemented by a dedicated processing circuit, such as an application specific integrated circuit (ASIC).

A registration control unit 301 performs processing for registering logical printers. For example, the registration control unit 301 generates a logical printer associated with a physical printer in response to a registration start request from a printing apparatus, and registers the logical printer in printer information 311. The logical printer registered in the printer information 311 is recognized as a printer by the information processing apparatus 110. A physical printer associated with a logical printer may be a physical printer that prints according to a printing job submitted to the logical printer. A logical printer may be associated with only one physical printer. A physical printer may be associated with only one logical printer or with a plurality of logical printers.

A printing control unit 302 performs processing related to printing jobs for logical printers. For example, the printing control unit 302 receives a printing job for a logical printer from the information processing apparatus 110, and based on this, transmits the printing job to a physical printer associated with the logical printer. Additionally, the printing control unit 302 may control an event related to a printing job. Events related to printing jobs may include, for example, receiving a printing job. In response to receiving an event request from a physical printer, the printing control unit 302 may respond with an event related to the physical printer.

A printer management unit 303 manages information regarding logical printers registered in the printing server 130 as the printer information 311. The printer information 311 includes capability information of a physical printer associated with a logical printer, a cloud printer ID uniquely assigned to a logical printer, information on a print queue in which printing jobs are spooled, and the like.

A job management unit 304 manages information regarding printing jobs received from the information processing apparatus 110 as job information 312. The job information 312 includes information on the printing job and the state of the printing job, printing data designated in the printing job, and the like.

A storage control unit 310 stores information in the RAM 202 or the storage device 204 or reads out information from the RAM 202 or the storage device 204 according to instructions from other functional units. According to some embodiments, the storage control unit 310 stores the printer information 311 and the job information 312.

Example of Functional Configuration of Information Processing Apparatus

Figure 4:
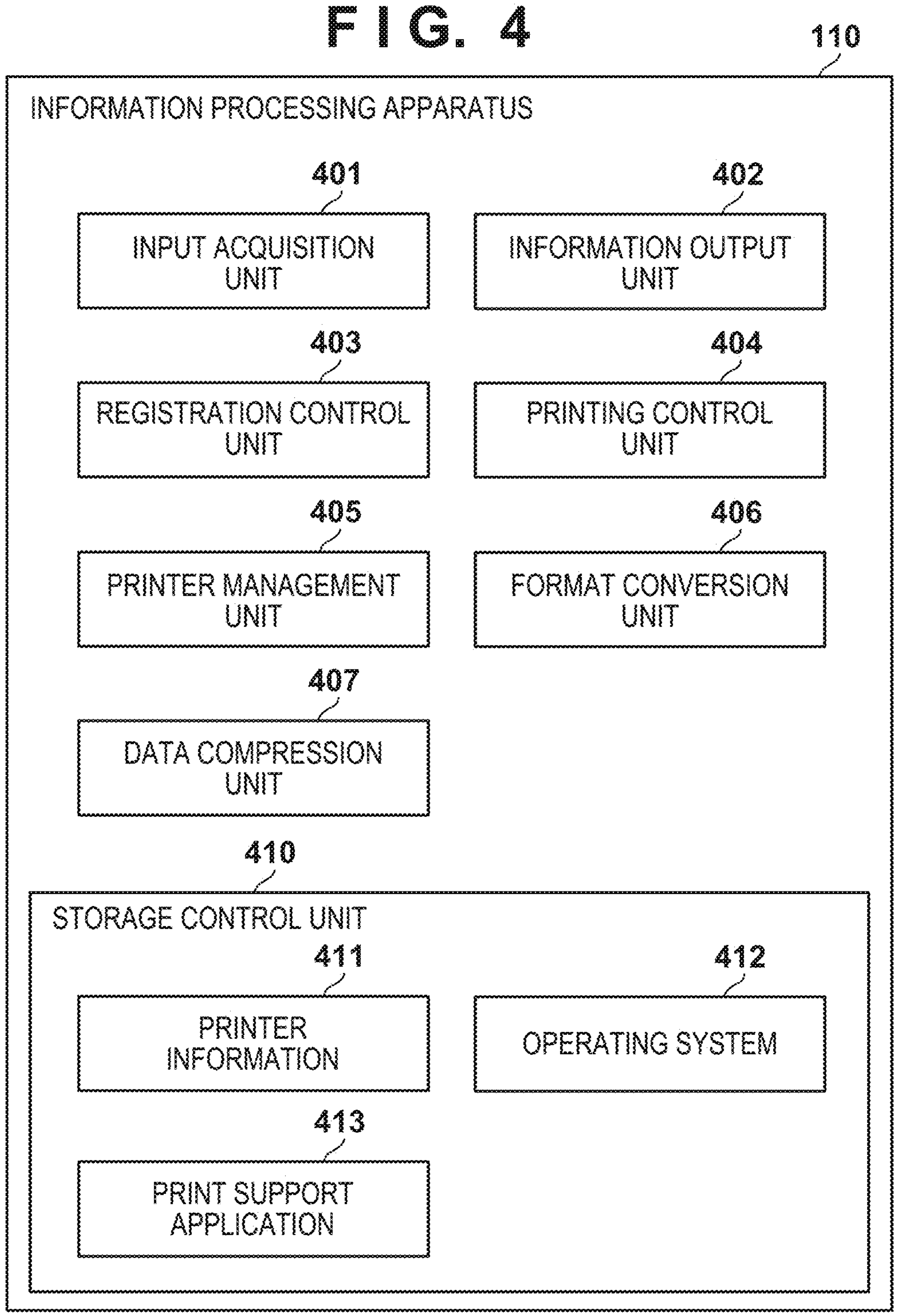
FIG. 4 is a block diagram illustrating an example of a functional configuration of an information processing apparatus according to some embodiments.

An example of a functional configuration of the information processing apparatus 110 will be described with reference to FIG. 4. The information processing apparatus 110 may have the functional units shown in FIG. 4. The information processing apparatus 110 may also have functional units not shown in FIG. 4. Each functional unit in FIG. 4 may be realized by the CPU 201 executing a program read out to the RAM 202. Alternatively, some or all of the functional units in FIG. 4 may be implemented by a dedicated processing circuit such as an ASIC.

An input acquisition unit 401 acquires input from the user of the information processing apparatus 110 using the input I/F 205. The information output unit 402 outputs information to the user of the information processing apparatus 110 using the output I/F 206.

A registration control unit 403 performs processing for registering a logical printer in the printing server 130. A printing control unit 404 performs processing related to printing performed by the printer. For example, the printing control unit 404 may transmit a printing job to a logical printer registered in the printing server 130 in accordance with a printing instruction from a user of the information processing apparatus 110. The printing control unit 404 may also transmit the printing job directly to a physical printer (that is, within the same LAN) in accordance with a printing instruction from the user of the information processing apparatus 110.

A printer management unit 405 manages information relating to printers to which the information processing apparatus 110 can submit a printing job as printer information 411. The printer information 411 includes printer capability information and the like. The printer management unit 405 may search for a printer to which the information processing apparatus 110 can submit a printing job.

A format conversion unit 406 converts the format of printing data designated by the user. For example, it is assumed that the format of printing data designated by the user is the Portable Document Format (PDF) format, and the printing apparatus designated by the user is not capable of printing PDF data. In this case, the format conversion unit 406 may convert the format of this printing data into a format that can be printed by the printing apparatus (e.g., raster).

A data compression unit 407 compresses printing data designated by the user. For example, if the printing apparatus specified by the user has a data decompression function, the data compression unit 407 may generate compressed data by compressing the printing data into a zip format, a gzip format, or the like. A data decompression function is a function for decompressing data compressed into a specific format. The compressed data may be decompressed and printed by a printing apparatus.

A storage control unit 410 stores information in the RAM 202 or the storage device 204 or reads out information from the RAM 202 or the storage device 204 according to instructions from other functional units. According to some embodiments, the storage control unit 410 stores the printer information 411, an operating system 412, and a print support application 413. The operating system 412 is installed on the information processing apparatus 110 as standard (i.e., when the information processing apparatus 110 is shipped). The operating system 412 may also be updated. The operating system 412 has functions for basic management and control of the information processing apparatus 110. As described above, the operating system 412 may include a standard printing function.

The print support application 413 is an application that runs on the operating system 412. The print support application 413 provides functions related to printing. Some or all of the input acquisition unit 401, the information output unit 402, the registration control unit 403, the printing control unit 404, the printer management unit 405, the format conversion unit 406, and the data compression unit 407 may be realized by the print support application 413. Alternatively, some or all of the input acquisition unit 401, the information output unit 402, the registration control unit 403, the printing control unit 404, the printer management unit 405, the format conversion unit 406, and the data compression unit 407 may be realized by the operating system 412 (e.g., as a standard printing function).

Example of Hardware Configuration of Printing Apparatus

Figure 5:
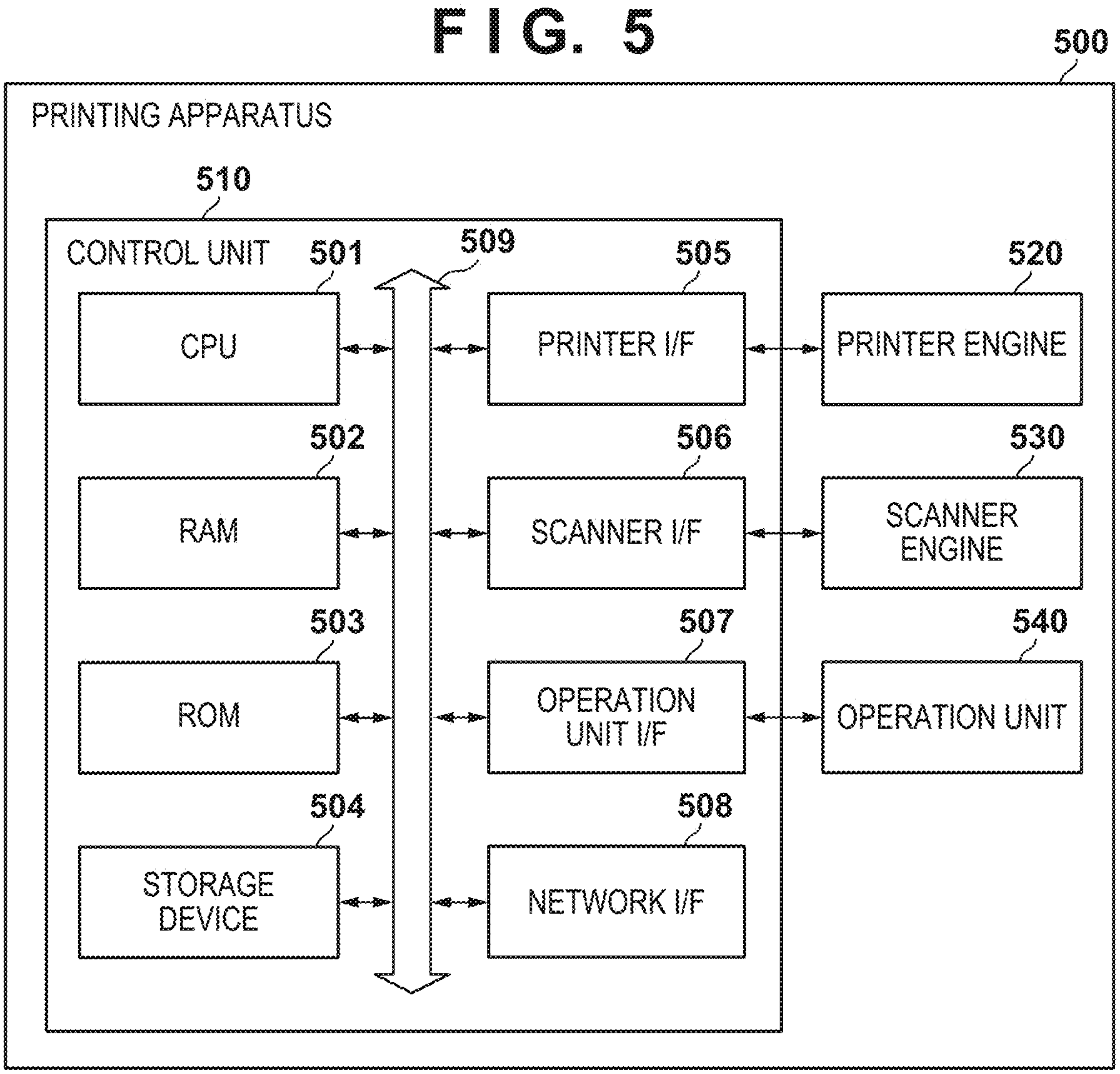
FIG. 5 is a block diagram illustrating an example of a hardware configuration of a printing apparatus according to some embodiments.

An example of a hardware configuration of a printing apparatus 500 according to some embodiments will be described with reference to FIG. 5. The printing apparatus 500 may be used as either the printing apparatus 120A or the printing apparatus 120B. The printing apparatus 500 may have the components shown in FIG. 5. Since the printing apparatus 500 is a physical printing apparatus, it can also be called a physical printer.

A CPU 501 is a general-purpose processing circuit that controls the overall operation of the printing apparatus 500.

A RAM 502 is a volatile memory circuit and is used as a temporary storage region such as a work region for processing performed by the CPU 501. A ROM 503 is a non-volatile memory circuit and stores programs and data used in processing performed by the CPU 501. A storage device 504 is a non-volatile storage device, and stores programs and data (e.g., printing jobs, image data, setting information) used in processing performed by the CPU 501. The storage device 504 may be, for example, an HDD or an SSD. The storage device 504 may also be referred to as a secondary storage device. The operations of the printing apparatus 500 may be realized by CPU 501 executing a program read out from the storage device 504 to the RAM 502.

A printer I/F 505 is an I/F for exchanging signals with a printer engine 520. The printer engine 520 performs printing based on signals (e.g., image signals and print commands) supplied from a control unit 510 through the printer I/F 505. Printing may be electrophotographic printing in which toner is transferred and fixed onto paper, inkjet printing in which ink is ejected onto paper, or three-dimensional printing.

A scanner I/F 506 is an I/F for exchanging signals with a scanner engine 530. The scanner engine 530 supplies a signal (e.g., an image signal) obtained by reading a document to the control unit 510 through the scanner I/F 506. The CPU 501 may process the image signal supplied from the scanner engine 530 and supply the resulting recorded image signal to the printer engine 520. Also, the CPU 501 may generate image data based on the image signal supplied from the scanner engine 530, and may transmit this to an external device.

An operation unit I/F 507 is an I/F for exchanging signals with an operation unit 540. The operation unit 540 is a device that obtains input from the user of the printing apparatus 500 and provides information to the user of the printing apparatus 500. The operation unit 540 may be constituted by, for example, a display panel (e.g., a liquid crystal display), a speaker, a touch panel, a keyboard, buttons, a touch screen, or any combination thereof.

A network I/F 508 is an I/F for communicating with a device external to the printing apparatus 500. The control unit 510 is constituted by the CPU 501, the RAM 502, the ROM 503, the storage device 504, the printer I/F 505, the scanner I/F 506, the operation unit I/F 507, and the network I/F 508. The constituent elements included in the control unit 510 are connected to a system bus 509.

Example of Functional Configuration of Printing Apparatus

Figure 6:
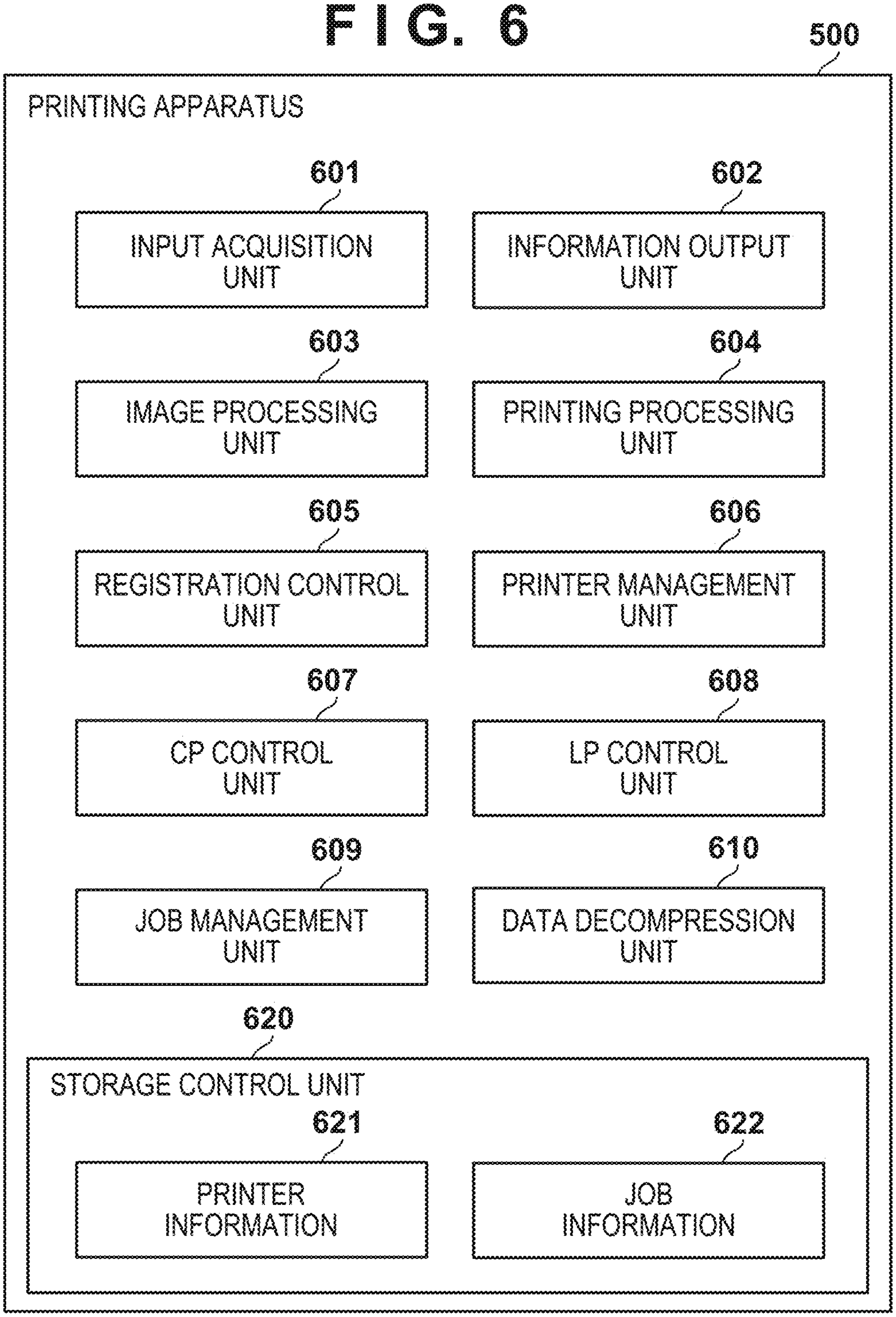
FIG. 6 is a block diagram illustrating an example of a functional configuration of a printing apparatus according to some embodiments.

An example of a functional configuration of the printing apparatus 500 will be described with reference to FIG. 6. The printing apparatus 500 may have the functional units shown in FIG. 6. The printing apparatus 500 may also have functional units not shown in FIG. 6. Each functional unit in FIG. 6 may be realized by the CPU 501 executing a program read out to the RAM 502. Alternatively, some or all of the functional units in FIG. 6 may be implemented by a dedicated processing circuit such as an ASIC.

An input acquisition unit 601 acquires input from the user of the printing apparatus 500 using the operation unit I/F 507. An information output unit 602 outputs information to the user of the printing apparatus 500 using the operation unit I/F 507. For example, the information output unit 602 displays an operation menu on the operation unit 540. The input acquisition unit 601 acquires input to the operation menu and notifies other functional units of the input instruction content. The information output unit 602 displays results obtained from other functional units on the operation unit 540.

An image processing unit 603 renders the printing job into image data for printing. A printing processing unit 604 prints the image data rendered by the image processing unit 603.

A registration control unit 605 performs processing for registering the logical printer associated with the printing apparatus 500 in the printing server 130. A printer management unit 606 manages information regarding the printing apparatus 500 as printer information 621. The printer information 621 may include, for example, the state of the printing apparatus 500, the capability of the printing apparatus 500, and a cloud printer ID uniquely assigned by the printing server 130 to the logical printer associated with the printing apparatus 500. Also, the printer information 621 may include a local printer ID for the information processing apparatus 110 to identify printing apparatuses within the same LAN 101.

A cloud print (CP) control unit 607 performs processing related to cloud print. For example, the CP control unit 607 may execute printing according to a printing job transmitted from the printing server 130 by transferring printing data included in the printing job received from the printing server 130 to the image processing unit 603. Also, the CP control unit 607 may transmit an event request to the printing server 130.

A local print (LP) control unit 608 performs processing related to local print. For example, the LP control unit 608 may respond to a printer search from the information processing apparatus 110. Also, the LP control unit 608 may execute printing according to a printing job transmitted from the information processing apparatus 110 by transferring printing data included in a printing job directly received from the information processing apparatus 110 to the image processing unit 603. A job management unit 609 manages information regarding a printing job as job information 622. The job information 622 may include the processing state and processing result of the printing job.

If the data included in the printing job is compressed (i.e., if it is compressed data), a data decompression unit 610 generates printing data by decompressing the data. The printing job may also include information indicating the compression format (e.g., zip or gzip) of the compressed data. The compressed data is decompressed by the data decompression unit 610 and then printed.

A storage control unit 620 stores information in the RAM 502 or the storage device 504 or reads out information from the RAM 502 or the storage device 504 according to an instruction from another functional unit. According to some embodiments, the storage control unit 620 stores the printer information 621 and the job information 622. The storage control unit 620 may also manage data as a file system. The storage control unit 620 may allocate the storage destination of each piece of data to the storage device 504, which is a non-volatile region, and the RAM 502, which is a volatile region. For example, the storage control unit 620 may store the printer information 621 and the job information 622 in a non-volatile region.

Overall Processing Sequence of Cloud Print

An overall processing sequence for performing cloud print will be described with reference to FIG. 7. The example in FIG. 7 deals with a case where the information processing apparatus 110 registers the printing apparatus 120A in the printing server 130 and submits a printing job to a logical printer associated with the printing apparatus 120A. Registering the printing apparatus 120A in the printing server 130 may mean registering a logical printer associated with the printing apparatus 120A in the printing server 130. In the following example, it is assumed that the printing apparatus 120A supports a web user interface (UI) function for operating the printing apparatus 120A from the information processing apparatus 110. Also, it is assumed that the information processing apparatus 110 supports a web UI client function. Mutual communication between the information processing apparatus 110, the printing apparatus 120A, and the printing server 130 may be performed using the Internet Printing Protocol (IPP).

In step S701, the registration control unit 403 of the information processing apparatus 110 transmits a registration start request to the printing apparatus 120A according to an instruction from the user of the information processing apparatus 110. The registration start request may be a request to start processing for registering the printing apparatus 120A in the printing server 130. The registration start request may be transmitted using the web UI client function of the information processing apparatus 110.

In step S702, the registration control unit 605 of the printing apparatus 120A transmits a registration start request to the printing server 130 in response to receiving the registration start request from the information processing apparatus 110. The registration start request may be a request to start processing for registering the printing apparatus 120A in the printing server 130.

In step S703, the registration control unit 301 of the printing server 130 transmits a registration start response to the printing apparatus 120A in response to receiving the registration start request from the printing apparatus 120A. The registration start response includes a uniform resource locator (URL) of a web page for the user of the information processing apparatus 110 to input information for registering the printing apparatus 120A in the printing server 130.

In step S704, the registration control unit 605 of the printing apparatus 120A transmits registration information to the information processing apparatus 110 in response to receiving the registration start response from the printing server 130. The registration information includes the URL included in the registration start response. The information output unit 402 of the information processing apparatus 110 displays a web page to the user in response to receiving the registration information from the printing apparatus 120A.

In step S705, the registration control unit 403 of the information processing apparatus 110 transmits a registration approval request to the printing server 130 in response to the user of the information processing apparatus 110 accessing the URL and inputting information necessary for registration. The registration approval request includes a cloud account of the user of the information processing apparatus 110. A cloud account is an account for a user to use a tenant of a cloud including the printing server 130.

In step S706, the registration control unit 301 of the printing server 130 checks whether or not the cloud account included in the registration approval request belongs to a user who has authority to register the printing apparatus 120A in the printing server 130. The registration control unit 301 of the printing server 130 transmits a registration approval response to the information processing apparatus 110 if the user has authority. The registration approval response may be a message that performs notification of the confirmation result that the user of the information processing apparatus 110 is a user who has authority to register the printing apparatus 120A.

In step S707, the printer management unit 606 of the printing apparatus 120A transmits a registration confirmation request to the printing server 130 in response to receiving the registration start response from the printing server 130. The registration confirmation request is a request related to registering the printing apparatus 120A in the printing server 130, and may specifically be a request to register the printing apparatus 120A in the printing server 130.

In step S708, the printer management unit 303 of the printing server 130 generates a new logical printer in response to receiving the registration confirmation request from the printing apparatus 120A, and adds the new logical printer to the printer information 311 in association with the printing apparatus 120A. As a result, the printing apparatus 120A is registered in the printing server 130, and the information processing apparatus 110 is enabled to perform cloud print using a logical printer. Also, the printer management unit 303 of the printing server 130 assigns a unique cloud printer ID to the generated logical printer, and adds this cloud printer ID to the printer information 311 in association with the logical printer. Thereafter, the registration control unit 301 of the printing server 130 transmits a registration confirmation response to the printing apparatus 120A. The registration confirmation response includes the cloud printer ID of the printing apparatus 120A.

In step S709, the printer management unit 606 of the printing apparatus 120A transmits an information update request to the printing server 130 in response to completion of registration of the printing apparatus 120A to the printing server 130. The information update request may be a request to update information regarding the printing apparatus 120A. The information update request includes printer attributes of the printing apparatus 120A. The information update request may be transmitted using an update-output-device-attributes request message defined in the IPP.

In step S710, the printer management unit 303 of the printing server 130 updates the information of the printing apparatus 120A included in the printer information 311 based on the printer attributes included in the received information update request, and transmits an information update response to the printing apparatus 120A. The information update response may be a message notifying that the information update of the printing apparatus 120A has been successfully completed.

In step S711, the CP control unit 607 of the printing apparatus 120A transmits an event request to the printing server 130 in response to receiving the registration confirmation response from the printing server 130. The event request may be a request to notify the printing apparatus 120A when an event related to the printing apparatus 120A occurs. The event request may relate to an event in which a printing job is submitted to a logical printer associated with the printing apparatus 120A.

In step S712, the printer management unit 405 of the information processing apparatus 110 transmits an information request to the printing server 130 according to an instruction from the user of the information processing apparatus 110. The information request may be a request for information regarding a logical printer available to the user of the information processing apparatus 110. The information request includes the cloud account of the user of the information processing apparatus 110. The information request may be transmitted in a Get-Printer-Attributes Request message defined in the IPP.

In step S713, the printer management unit 303 of the printing server 130 transmits an information response to the information processing apparatus 110 in response to receiving the information request from the information processing apparatus 110. The information response includes a cloud printer ID and printer attributes for each of the one or more logical printers available to the user of the information processing apparatus 110. The printer management unit 405 of the information processing apparatus 110 updates the printer information 411 based on the information response. The information response may be transmitted in a Get-Printer-Attributes Response message defined in the IPP.

In step S714, the printer management unit 405 of the information processing apparatus 110 transmits a printing request to the printing server 130 according to an instruction from the user of the information processing apparatus 110. The printing request includes a cloud printer ID, a printing job, and a cloud account of the user of the information processing apparatus 110. A printing job may include printing data and print settings. The printing request may be a request for a logical printer having a cloud printer ID included in the printing request to print the printing data included in the printing request. The printing request may be transmitted using a Send-Document Request message defined in the IPP.

In step S715, the printing control unit 302 of the printing server 130 transmits an event response to the printing apparatus 120A associated with the logical printer in response to receiving the printing request from the information processing apparatus 110. The event response is a response to the event request received in step S711. The event response is a response for notifying that the type of event specified in the event request has occurred.

In step S716, the CP control unit 607 of the printing apparatus 120A transmits a printing job request to the printing server 130 in response to receiving the event response from the printing server 130. The printing job request may be a request for a printing job that is to be executed by the printing apparatus 120A.

In step S717, the printing control unit 302 of the printing server 130 transmits a printing job response to the printing apparatus 120A in response to receiving the printing job request from the printing apparatus 120A. The printing job response includes the cloud account and the printing job. Thereafter, in response to receiving a printing job response from printing server 130, the printing apparatus 120A performs printing based on the printing job. The printing job response received by the printing apparatus 120A from the printing server 130 may be an IPP Fetch-Job Response.

Figure 7:
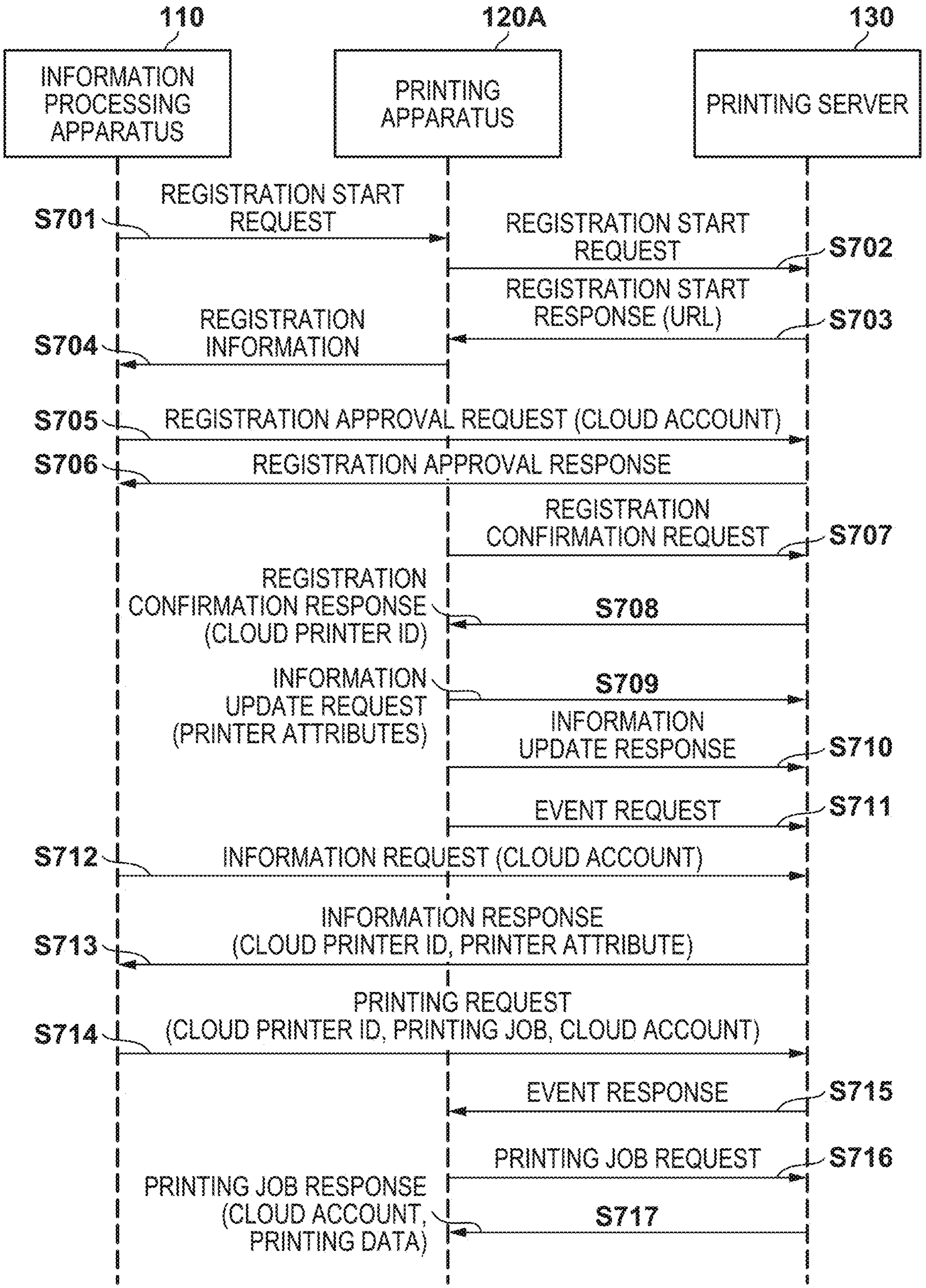
FIG. 7 is a sequence diagram illustrating overall processing of cloud print according to some embodiments.

In the description of FIG. 7, registration of the printing apparatus 120A in steps S701 to S706 and cloud print in steps S712 to S717 may be performed by the same user or by another user.

Printer Attributes

With reference to FIG. 8, an example of printer attributes transmitted by the printing apparatus 120A in steps S709 and S713 of FIG. 7 will be described. In the example of FIG. 8, printer attributes 800 are expressed in a table format. Alternatively, the printer attributes 800 may be expressed in another format. The printer attributes 800 include columns 801 and 802. The column 801 represents the names of the attributes. The column 802 represents the values of the attributes.

A record 811 indicates whether or not the printing apparatus 120A supports color printing. The name of the attribute is "color-supported". The value of the attribute is "true" if the printing apparatus 120A supports color printing, and "false" if the printing apparatus 120A does not support color printing. The printer attribute 800 indicates that the printing apparatus 120A supports color printing.

The record 812 indicates paper sizes supported by the printing apparatus 120A. The name of the attribute is "media-supported". The values of the attribute are character strings assigned to separate paper sizes. The printer attributes 800 indicate that the printing apparatus 120A supports A4 paper, which is represented by iso_a4_210×297 mm, and A3 paper, which is represented by iso_a3_297×420 mm.

A record 813 indicates the format of data that can be printed by the printing apparatus 120A. The name of the attribute is "document-format-supported". The values of the attribute are character strings assigned to separate formats. The printer attributes 800 indicate that the printing apparatus 120A can print data in PDF format, JPEG format, raster format, and text format.

A record 814 indicates the format of data that printing apparatus 120A can decompress. The name of the attribute is "compression-supported". The values of the attribute are character strings assigned to separate formats. The printer attributes 800 indicate that the printing apparatus 120A can decompress data in zip format and gzip format. If the printing apparatus 120A does not have a data decompression function, the printer attributes 800 need not include the record 814, or a value (e.g., null) indicating that the printing apparatus 120A does not have a data decompression function may be included in the column 802 of the record 814.

The record 815 indicates the number of print copies supported by the printing apparatus 120A. The name of the attribute is "copies-supported". The value of the attribute is a numeric range. The printer attributes 800 indicate that the printing apparatus 120A supports printing of 1 to 99 copies.

Operation Flow in which Information Processing Apparatus Requests Printing in Cloud Print With reference to FIG. 9, an example of a control method for controlling the information processing apparatus 110 such that the information processing apparatus 110 executes processing for requesting printing in cloud print will be described. The method in FIG. 9 may be started, for example, in response to acquiring a printing instruction from the user of the information processing apparatus 110 in step S714 in FIG. 7. The printing instruction may include a designation of printing data to be printed by the printing apparatus. The printing data is data representing print content. When the information processing apparatus 110 manages data using a file system, the printing data may be a file in a specific format.

Figure 9:
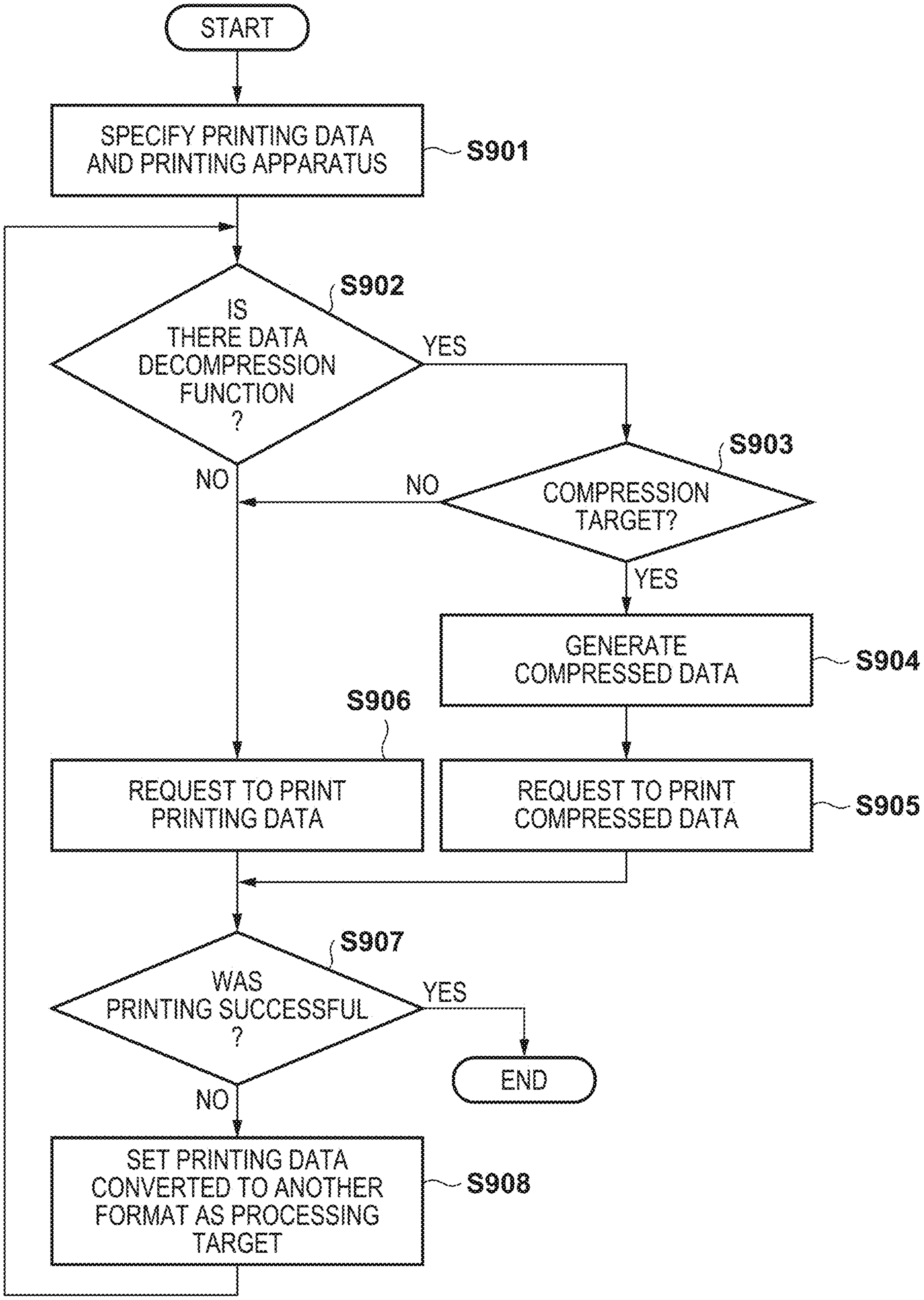
FIG. 9 is a flow diagram illustrating an example of a method for controlling an information processing apparatus according to some embodiments.

Each step of the method in FIG. 9 may be performed by the CPU 201 of the information processing apparatus 110 executing a program loaded to the memory (e.g., RAM 202) of the information processing apparatus 110. Alternatively, some or all of the steps of the method of FIG. 9 may be performed by a dedicated integrated circuit, such as an ASIC.

In step S901, the information processing apparatus 110 (e.g., the printing control unit 404 thereof) specifies the printing data designated by the user of the information processing apparatus 110 (hereinafter simply referred to as the user) in the printing instruction and the printing apparatus that is to print the printing data. In the following description, the printing data specified in step S901 will be simply referred to as printing data. The printing apparatus that is to print the printing data may be designated by the user together with the designation of the printing data. For example, by designating one of the one or more logical printers managed by the printing server 130, a user may designate that the printing apparatus associated with this logical printer prints the printing data. Alternatively, the printing apparatus that is to print the printing data may be a printing apparatus determined in advance (e.g., a default printing apparatus). In the following description, it is assumed that the printing apparatus that is to print the printing data is the printing apparatus 120A.

In step S902, the information processing apparatus 110 (e.g., the printing control unit 404 thereof) refers to the printer information 411 and determines whether or not the printing apparatus 120A has a data decompression function. The information processing apparatus 110 moves to the processing of step S903 if it is determined that the printing apparatus 120A has a data decompression function ("YES" in step S902), and moves to the processing of step S905 otherwise ("NO" in step S902). As described above, the printer information 411 may include information shown in the printer attributes 800 of FIG. 8. The record 814 of the printer attributes 800 indicates whether or not the printing apparatus has a data decompression function.

The printer information 411 may be acquired by the information processing apparatus 110 transmitting an information request to the printing server 130 in step S713 described above. The information processing apparatus 110 may transmit the information request at any time before the execution of step S902. For example, when a printer that can be used by the information processing apparatus 110 is discovered, the information processing apparatus 110 (e.g., the printer management unit 405 thereof) may transmit an information request regarding this printer. Instead of or in addition to this, the information processing apparatus 110 (e.g., the printer management unit 405 thereof) may transmit an information request regarding a printer that can be used by the information processing apparatus 110 when the user opens a screen for instructing printing.

Step S903 is executed when it is determined that the printing apparatus 120A has a data decompression function. In step S903, the information processing apparatus 110 (e.g., the printing control unit 404 thereof) determines whether or not the format of the printing data is a compression target. The information processing apparatus 110 moves to the processing of step S904 if it is determined that the format of the printing data is a compression target ("YES" in step S903), and moves to the processing of step S906 otherwise ("NO" in step S903).

The format that is a compression target may be specified in advance by, for example, the manufacturer of the operating system 412 or the print support application 413, and stored in the memory of the information processing apparatus 110. A format with low compression efficiency, such as a PDF format or a JPEG format, may be designated as not a compression target, and a format with high compression efficiency, such as a text format or raster format, may be designated as a compression target. The information processing apparatus 110 may store a list of data formats that are not compression targets (including, for example, PDF format and JPEG format), exclude formats included in this list from being compression targets, and set formats that are not included in this list as compression targets. Alternatively, the information processing apparatus 110 may store a list of data formats that are compression targets (including, for example, raster format and text format), set formats included in this list as compression targets, and exclude formats not included in this list from being compression targets. By not setting printing data in a specific format as a compression target in this way, time loss resulting from compression processing is suppressed.

Figure 10:
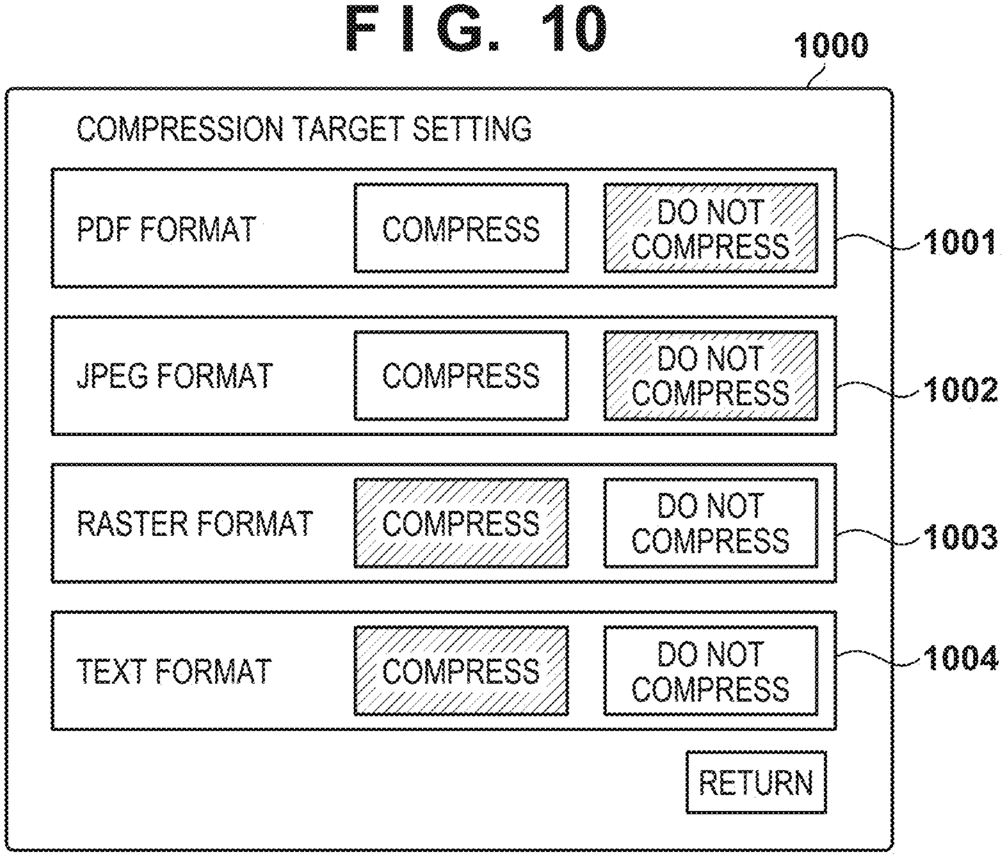
FIG. 10 is a schematic diagram illustrating an example of a screen for acquiring designation of a format that is a compression target according to some embodiments.

The information processing apparatus 110 (e.g., the input acquisition unit 401 thereof) may acquire the designation of the format of the printing data that is to be set as a compression target from the user. With reference to FIG. 10, an example of a screen 1000 displayed on the output device 220 of the information processing apparatus 110 to acquire from the user the designation of the format of printing data that is to be set as a compression target will be described.

The screen 1000 includes a plurality of graphical objects 1001 to 1004 for designating whether or not a particular format is to be set as a compression target. For example, the graphical object 1001 is a graphical object for designating whether or not data in PDF format is to be set as a compression target. The user can designate that the PDF format is to be set as a compression target by selecting the button labeled "compress". On the other hand, the user can specify that the PDF format is not to be set as a compression target by selecting a button labeled "do not compress". The information processing apparatus 110 stores the designation given by the user in a storage (e.g., the RAM 202 or the storage device 204), and uses it in the determination in step S903.

Step S904 is executed when it is determined that the printing apparatus 120A has a data decompression function and it is determined that the format of the printing data is a compression target. In step S904, the information processing apparatus 110 (e.g., the data compression unit 407 thereof) generates compressed data by compressing the printing data. The information processing apparatus 110 compresses the printing data into data in a format that can be decompressed by the printing apparatus 120A and can be compressed by the information processing apparatus 110. For example, if the printing apparatus 120A is capable of decompressing data in zip format and the information processing apparatus 110 is capable of compressing printing data into data in zip format, the information processing apparatus 110 may compress the printing data into data in zip format. If there are a plurality of formats that can be decompressed by the printing apparatus 120A and can be compressed by the information processing apparatus 110, the information processing apparatus 110 may compress the printing data into data of one format selected according to some selection criterion (e.g., a predetermined priority level). If there is no format that can be decompressed by the printing apparatus 120A and can be compressed by the information processing apparatus 110, the information processing apparatus 110 may execute step S906 instead of executing steps S904 and S905.

In step S905, the information processing apparatus 110 (e.g., the printing control unit 404 thereof) requests printing of the compressed data by the printing apparatus 120A. Specifically, the information processing apparatus 110 transmits a request for the printing apparatus 120A to print the compressed data (i.e., the printing request in step S714) to the printing server 130. The printing request may include the compressed data. By including the compressed data instead of the printing data in the printing request in this way, the data size of the printing request is reduced. The printing request may be transmitted using a Send-Document Request message defined in the IPP. The printing request may include an indication of the format of the compressed data (e.g., zip). The format of the compressed data may be designated by the compression attribute of the Send-Document Request message. The inclusion of the compression attribute in the Send-Document Request message indicates that the data included in the printing request is compressed data. The format (for example, raster or text) of the printing data (i.e., data obtained by decompressing the compressed data) may be designated in the document-format attribute of the Send-Document Request message.

Step S906 is executed when it is not determined that the printing apparatus 120A has a data decompression function or when it is determined that the printing data is not a compression target. This may include a case where it is determined that the printing apparatus 120A does not have a data decompression function, and a case where it cannot be determined whether or not the printing apparatus 120A has a data decompression function. For example, if the printer information 411 clearly indicates that the printing apparatus 120A does not have the data decompression function, it may be determined that the printing apparatus 120A does not have the data decompression function. If the printer information 411 does not include information regarding the printing apparatus 120A (e.g., information regarding the data decompression function), it may not be determined that the printing apparatus 120A has the data decompression function.

In step S906, the information processing apparatus 110 (e.g., the printing control unit 404 thereof) requests the printing data to be printed by the printing apparatus 120A. Specifically, the information processing apparatus 110 transmits a request for the printing apparatus 120A to print the printing data (i.e., the printing request in step S714) to the printing server 130. In this case, the information processing apparatus 110 does not request the compressed data to be printed by the printing apparatus 120A. The printing request may include the printing data. The printing request may be transmitted using a Send-Document Request message defined in the IPP. The Send-Document Request message not including the compression attribute indicates that the data included in the printing request is not compressed data but printing data (i.e., data that has not been compressed by the information processing apparatus 110 at the time of the printing request). The format of the printing data (e.g., raster or text) may be designated in the document-format attribute of the Send-Document Request message.

In step S907, the information processing apparatus 110 (e.g., the printing control unit 404 thereof) determines whether or not printing based on the printing request made in step S905 or S906 was successful. The information processing apparatus 110 ends the processing if it is determined that the printing was successful ("YES" in step S907), and moves to the processing of step S908 otherwise ("NO" in step S907). The information processing apparatus 110 may perform the determination in step S907 based on the notification transmitted by the printing server 130. This notification may also be transmitted in a Send-Document Response message defined in the IPP. The printing apparatus 120A may transmit a Send-Document Response message whose Status-Code attribute value is Successful to the printing server 130 when printing of the printing data or the compressed data is successful. The printing server 130 may transmit this message to the information processing apparatus 110. The information processing apparatus 110 may determine that printing was successful when the value of the Status-Code attribute of the Send-Document Response message is Successful.

Step S908 is executed when it is determined that printing based on the printing request made in step S905 or S906 has failed. The information processing apparatus 110 may determine that printing has failed when the notification from the printing server 130 indicates that the printing performed by the printing apparatus 120A has failed. The printing apparatus 120A may transmit a Send-Document Response message whose Status-Code attribute value is other than Successful to the printing server 130 when printing of the printing data or the compressed data fails. For example, when the printing apparatus 120A fails to decompress the compressed data, the printing apparatus 120A may set the value of the Status-Code attribute to client-error-compression-error. The printing apparatus 120A may set the value of the Status-Code attribute to document-format-error when the format of the printing data or the compressed data is not a printable format. The printing server 130 may transmit this message to the information processing apparatus 110. The information processing apparatus 110 may determine that printing has failed when the value of the Status-Code attribute of the Send-Document Response message is other than Successful. In addition to this, the information processing apparatus 110 may determine that printing has failed if a notification from the printing server 130 is not received within a predetermined amount of time.

Step S908 is executed when it is determined that the printing apparatus 120A has failed to print the printing data or the compressed data. In step S908, the information processing apparatus 110 (e.g., the format conversion unit 406 thereof) generates new printing data by converting the format of the printing data. Thereafter, the information processing apparatus 110 sets this new printing data as a processing target. The format of the new printing data is selected from the formats of data that can be printed by the printing apparatus 120A. As described above, the format of data that can be printed by the printing apparatus 120A is included in the printer information 411. For example, if the format of the printing data designated by the user is PDF format and the printing apparatus 120A is capable of printing data in raster format, the information processing apparatus 110 may convert the printing data in PDF format into printing data in raster format. When there are a plurality of other formats that can be printed by the printing apparatus 120A, the information processing apparatus 110 may convert the printing data to printing data of one format selected according to some selection criterion (e.g., a predetermined priority level). If there is no other format that can be printed by the printing apparatus 120A, the information processing apparatus 110 may end the processing. At this time, the information processing apparatus 110 may notify the user that printing has failed.

After step S908, the information processing apparatus 110 executes the processing of step S902 and onward on the new printing data (i.e., the printing data whose data format has been converted). If it is determined that the printing apparatus 120A has a data decompression function and it is determined that the format of the new printing data is a compression target, the information processing apparatus 110 generates new compressed data in step S904, and requests printing of this compressed data in step S905. If it is determined that the printing apparatus 120A does not have a data decompression function, or if it is determined that the format of the new printing data is not a compression target, the information processing apparatus 110 requests printing of this new printing data in step S905.

For example, it is assumed that the format of the printing data designated by the user is PDF format. Since the PDF format is not a compression target, the information processing apparatus 110 transmits the printing data in the PDF format to the printing server 130 in step S906. It is assumed that the printing apparatus 120A subsequently fails to print the printing data in PDF format. In response to this failure, the information processing apparatus 110 converts the printing data to a format other than PDF format (here, raster format) in step S908, and executes the processing of step S902 and onward on this printing data in raster format. Since the raster format is a compression target, the information processing apparatus 110 generates the compressed data by compressing the raster format printing data in step S904, and transmits this compressed data to the printing server 130 in step S905.

By requesting printing again in this manner, it is possible to prevent the printing request from ending with an error. Furthermore, by retransmitting the printing data in another format (that is, printing data in a format different from that of the initially requested printing data) when decoding fails, it is possible to prevent decoding from failing again. Also, by determining again whether or not the printing data is a compression target when retransmitting the printing data, the amount of data in the printing request at the time of retransmission is reduced. The information processing apparatus 110 may retransmit printing data without user involvement.

In the method of FIG. 9, the information processing apparatus 110 transmits the printing data designated by the user to the printing server 130 without converting the format, and if the printing apparatus 120A fails to print this printing data, the information processing apparatus 110 converts the format of the printing data in step S908. Alternatively, the information processing apparatus 110 may determine between step S901 and step S902 whether or not the format of the printing data designated by the user can be printed by the printing apparatus 120A. If it is determined that the format of the printing data designated by the user can be printed by the printing apparatus 120A, the information processing apparatus 110 may perform the processing of step S902 and onward on this printing data. If it is determined that the format of the printing data designated by the user cannot be printed by the printing apparatus 120A, the information processing apparatus 110 may convert the format of this printing data to a format that can be printed by the printing apparatus 120A by performing processing similar to step S908. Thereafter, the information processing apparatus 110 may execute the processing of step S902 and onward on the new printing data whose format has been converted. In this manner, by confirming the format that is executable by the printing apparatus 120A before first making a printing request, the likelihood of a printing failure can be reduced.

In the method of FIG. 9, the determination in step S902 may also be omitted. In this case, the information processing apparatus 110 may transition to step S903 after executing step S901. If the printing apparatus 120A does not have a data decompression function, notification of failure to print the compressed data is performed, and therefore a determination of "NO" is made in step S907, and the printing data or the compressed data is retransmitted in subsequent step S905 or step S906.

Overall Processing Sequence of Local Print

Figure 11:
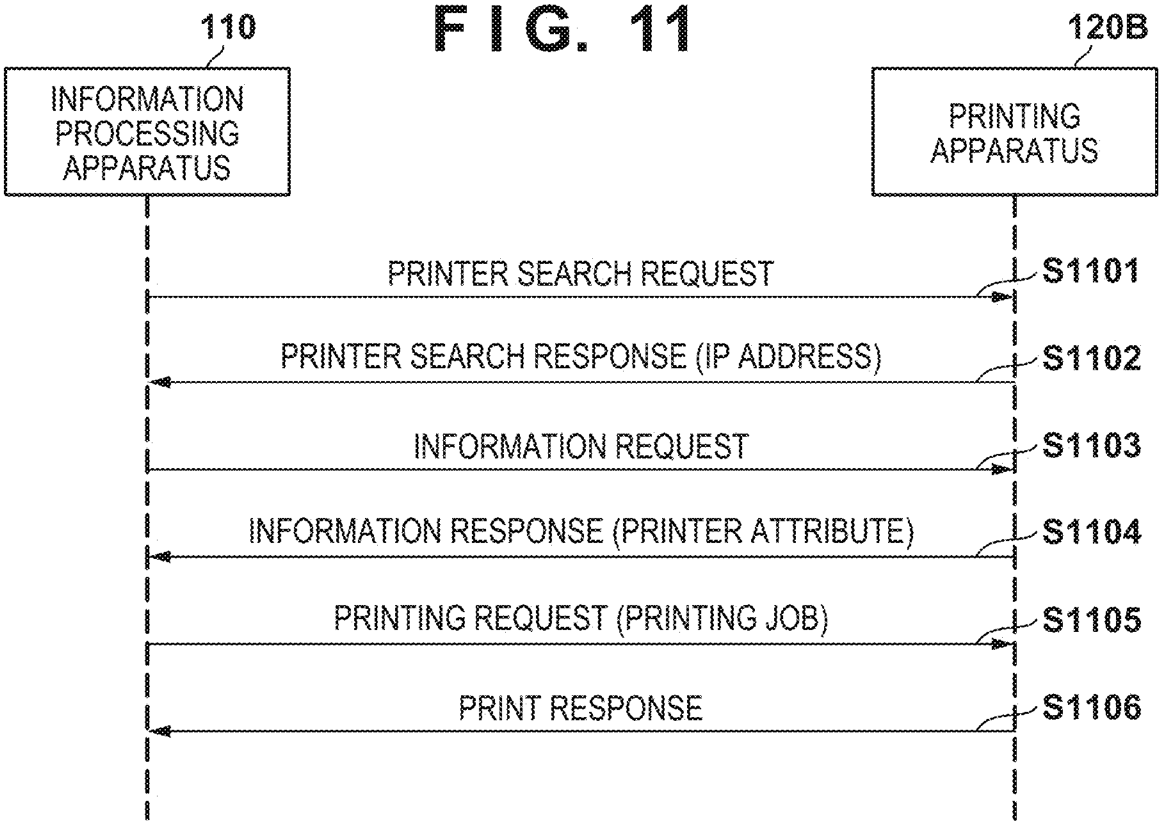
FIG. 11 is a sequence diagram illustrating overall processing of local print according to some embodiments.

An overall processing sequence for local print will be described with reference to FIG. 11. The example in FIG. 11 deals with a case where the information processing apparatus 110 submits a printing job to the printing apparatus 120B connected to the same network as the information processing apparatus 110 (i.e., LAN 101). Communication between the information processing apparatus 110 and the printing apparatus 120B may also be performed using the IPP. Communication between the information processing apparatus 110 and the printing apparatus 120B is performed within the LAN 101 and does not go through the wide area network 103.

In step S1101, the printer management unit 405 of the information processing apparatus 110 transmits a printer search request to the network (i.e., LAN 101) to which the information processing apparatus 110 is connected, according to an instruction from the user of the information processing apparatus 110. This printer search request may be performed by broadcasting to the LAN 101.

In step S1102, the LP control unit 608 of the printing apparatus 120B transmits a printer search response to the information processing apparatus 110 in response to the printer search request. The printer search response may include the Internet Protocol (IP) address of the printing apparatus 120B. The printer management unit 405 of the information processing apparatus 110 stores the IP address of the printing apparatus 120B that transmitted the printer search response in the storage control unit 410 as part of the printer information 411. Also, the information output unit 402 of the information processing apparatus 110 may present a list of discovered printing apparatuses to the user.

In step S1103, the printer management unit 405 of the information processing apparatus 110 transmits an information request to the printing apparatus 120B. The information request may be a request for information regarding the printing apparatus 120B. The information request may be sent in a Get-Printer-Attributes Request message defined in the IPP.

In step S1104, the printer management unit 606 of the printing apparatus 120B transmits an information response to the information processing apparatus 110 in response to receiving the information request from the information processing apparatus 110. The information response includes printer attributes of the printing apparatus 120B (e.g., the printer attributes 800 in FIG. 8). The printer management unit 405 of the information processing apparatus 110 updates the printer information 411 based on the information response. The information response may be transmitted in a Get-Printer-Attributes Response message defined in the IPP.

In step S1105, the printing control unit 404 of the information processing apparatus 110 transmits a printing request to the printing apparatus 120B according to an instruction from the user of the information processing apparatus 110. The printing request includes a printing job. A printing job may include printing data and print settings. The printing request may be a request to the printing apparatus 120B to print the printing data included in the printing request.

In step S1106, the LP control unit 608 of the printing apparatus 120B executes printing according to the received printing job. The LP control unit 608 of the printing apparatus 120B transmits the printing result to the information processing apparatus 110 as a print response.

Operation Flow in which Information Processing Apparatus Requests Printing in Local Print The control method for controlling the information processing apparatus 110 such that the information processing apparatus 110 executes processing for requesting printing in local print may be the same as the method shown in FIG. 9, and therefore redundant description will be omitted. In local print, the information processing apparatus 110 transmits the printing request to the printing apparatus 120B instead of transmitting the printing request to the printing server 130, in steps S905 and S906.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-082487, filed May 18, 2023, which is hereby incorporated by reference herein in its entirety.

What is claimed is:

1. An information processing apparatus, comprising:

an acquisition unit configured to acquire, from a user, designation of printing data to be printed by a printing apparatus;

a compression unit configured to generate compressed data by compressing the printing data in a case where a format of the printing data is a compression target; and a request unit configured to request the compressed data to be printed by the printing apparatus in a case where the format of the printing data is a compression target, and request the printing data to be printed by the printing apparatus in a case where the format of the printing data is not a compression target, wherein the compression target is specified by one or more predetermined formats stored in a memory of the information processing apparatus, and wherein the request unit is further configured to use a message to:

i) transmit, together with the compressed data, a compression attribute indicating that data requested to be printed by the printing apparatus is compressed and a document-format attribute indicating a format of the printing data obtained by decompressing the compressed data, in a case where the compressed data is requested to be printed by the printing apparatus; and ii) transmit, together with the printing data, the document-format attribute and does not transmit the compression attribute, in a case where the printing data is requested to be printed by the printing apparatus.

2. The information processing apparatus according to claim 1, further comprising a conversion unit configured to generate second printing data by converting the format of the printing data in a case where the printing apparatus fails to print the printing data or the compressed data, wherein the compression unit further generates second compressed data by compressing the second printing data in a case where a format of the second printing data is a compression target, and the request unit further requests the second compressed data to be printed by the printing apparatus in a case where the format of the second printing data is a compression target, and further requests the second printing data to be printed by the printing apparatus in a case where the format of the second printing data is not a compression target.

3. The information processing apparatus according to claim 1, wherein the acquisition unit further acquires, from the user, designation of a format of printing data that is a compression target.

4. The information processing apparatus according to claim 1, further comprising:

a specifying unit configured to specify a format that can be printed by the printing apparatus; and a conversion unit configured to generate third printing data by converting the format of the printing data to a format that can be printed by the printing apparatus in a case where the format of the printing data cannot be printed by the printing apparatus, wherein the request unit requests the printing data or the compressed data to be printed by the printing apparatus in a case where the format of the printing data can be printed by the printing apparatus, the compression unit generates third compressed data by compressing the third printing data in a case where the format of the third printing data is a compression target, and the request unit requests the third compressed data to be printed by the printing apparatus in a case where the format of the third printing data is a compression target, and requests the third printing data to be printed by the printing apparatus in a case where the format of the third printing data is not a compression target.

5. The information processing apparatus according to claim 1, further comprising:

a determination unit configured to determine whether the printing apparatus has a data decompression function, wherein in a case where it is determined that the printing apparatus has the data decompression function and the format of the printing data is a compression target, the request unit requests the compressed data to be printed by the printing apparatus.

6. The information processing apparatus according to claim 5, wherein in a case where it is not determined that the printing apparatus has the data decompression function, the request unit requests the printing data to be printed by the printing apparatus without requesting the compressed data to be printed by the printing apparatus.

7. The information processing apparatus according to claim 1, wherein a message defined in the Internet Printing Protocol (IPP) is used to request the printing data or the compressed data to be printed by the printing apparatus.

8. The information processing apparatus according to claim 1, wherein the request unit transmits the request for the printing apparatus to print the printing data or the compressed data to the printing apparatus.

9. The information processing apparatus according to claim 1, wherein the information processing apparatus can communicate with a printing server via a wide area network, and the request unit transmits the request for the printing apparatus to print the printing data or the compressed data to the printing server.

10. A non-transitory computer-readable storage medium comprising a program for causing a computer to function as the information processing apparatus according to claim 1.

11. A method for controlling an information processing apparatus, the method comprising:

acquiring, from a user, designation of printing data to be printed by a printing apparatus;

generating compressed data by compressing the printing data in a case where a format of the printing data is a compression target; and requesting the compressed data to be printed by the printing apparatus in a case where the format of the printing data is a compression target, and requesting the printing data to be printed by the printing apparatus in a case where the format of the printing data is not a compression target, wherein the compression target is specified by one or more predetermined formats stored in a memory of the information processing apparatus, and wherein a message is used to:

i) transmit, together with the compressed data, a compression attribute indicating that data requested to be printed by the printing apparatus is compressed and a document-format attribute indicating a format of the printing data obtained by decompressing the compressed, in a case where the compressed data is requested to be printed by the printing apparatus; and ii) transmit, together with the printing data, the document-format attribute and does not transmit the compression attribute, in a case where the printing data is requested to be printed by the printing apparatus.

* * * * *